F. A. FISHBAUGH.
CORN HUSKING MACHINE.
APPLICATION FILED MAY 29, 1918.
1,315,714.
Patented Sept. 9, 1919.
4 SHEETS—SHEET 4.
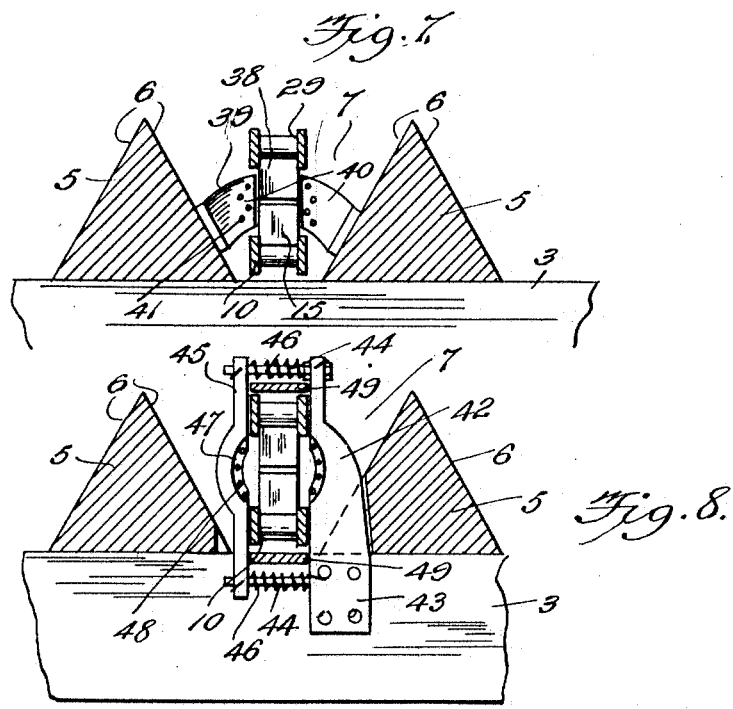
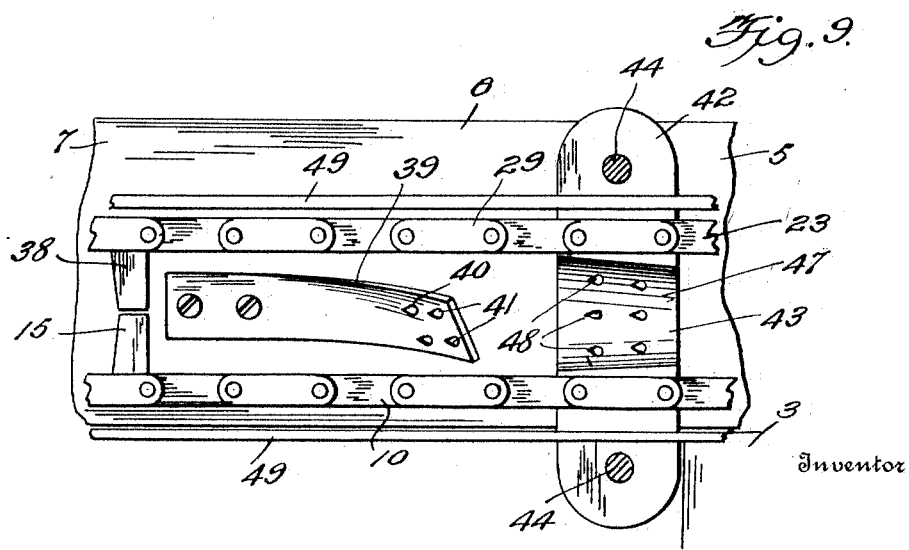

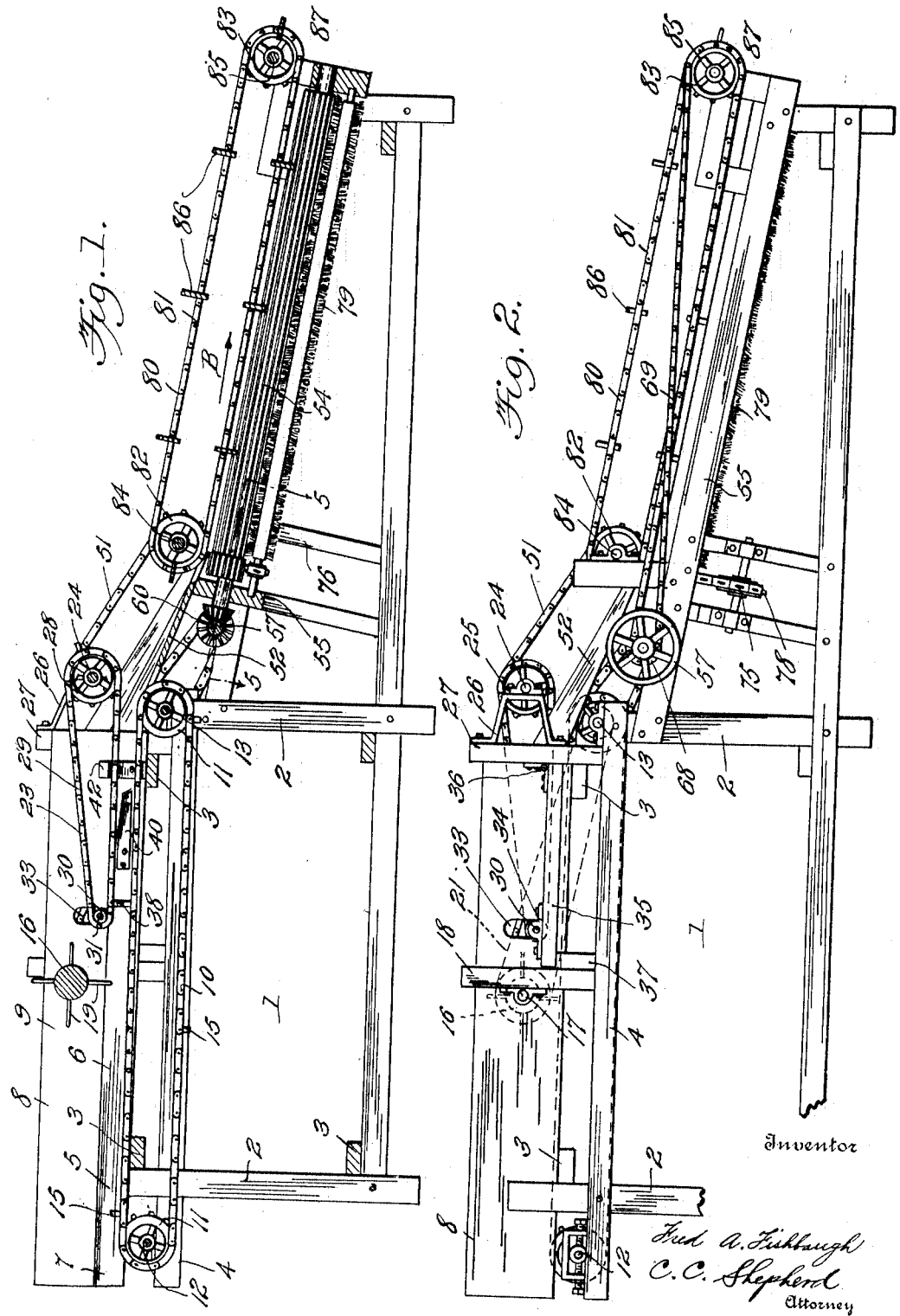

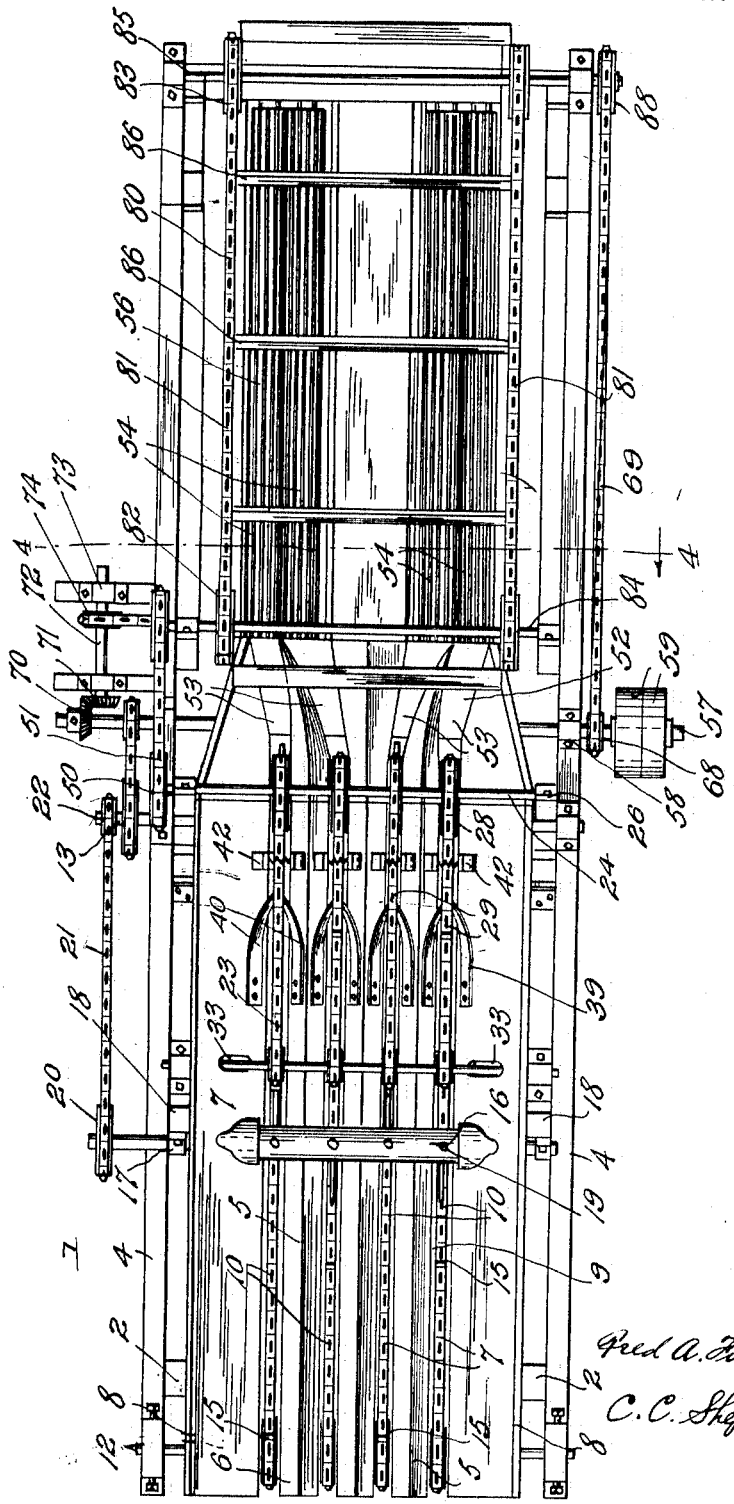

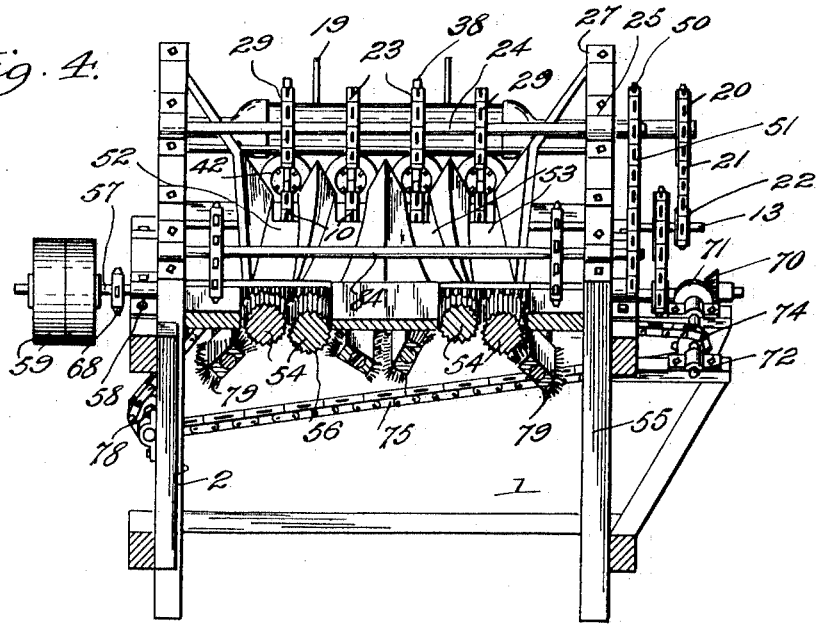
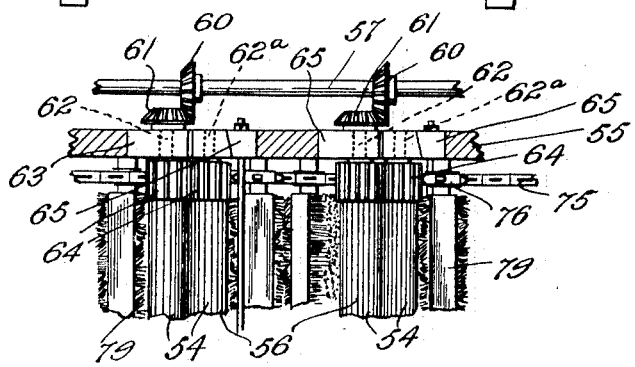
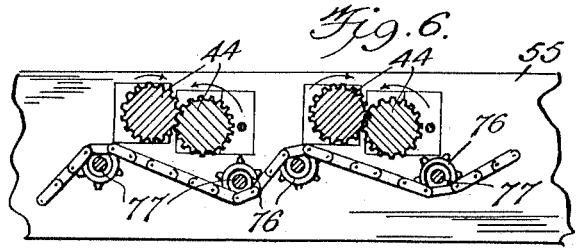

UNITED STATES PATENT OFFICE.

FRED A. FISHBAUGH, OF LONDON, OHIO.

CORN-HUSKING MACHINE.

1,315,714.   Specification of Letters Patent.   Patented Sept. 9, 1919.

Application filed May 29, 1918. Serial No. 237,309.

*To all whom it may concern:*

Be it known that I, FRED A. FISHBAUGH, a citizen of the United States, residing at London, in the county of Madison and State of Ohio, have invented certain new and useful Improvements in Corn-Husking Machines, of which the following is a specification.

This invention relates to an improved machine for effecting the husking of corn in an efficient and practical manner, and provides mechanism for introducing ears of corn into a longitudinally operating shredding device and for automatically conveying the shredded corn from said device to a husk removing structure.

An object of the invention is to provide novel mechanism in the form of longitudinally extending guides for the reception of ears of corn and to provide means in conjunction with said guides for effecting an individual lengthwise movement of each ear of corn longitudinally of said guides and to provide coöperative means in conjunction with said guides for firmly gripping an ear of corn and for placing the same through an improved shredding apparatus, whereby the husk will be substantially loosened from each ear prior to being subjected to the action of the husking rolls.

In carrying out the invention, use is made of an ear receiving structure comprising a plurality of longitudinally extending, spaced, parallel guides into which ears of corn are adapted to be placed, conveyer means being provided for effecting longitudinal and individual movement of each ear of corn deposited in said guides, shredding mechanism being situated parallel with said conveyer for loosening the husks from said ears during their period of coöperation with said conveyers, means being provided for conducting the shredded ears of corn from said conveyer structure to a plurality of husking rolls, these rolls being situated to extend longitudinally of the machine, and are provided with fluted surfaces, whereby during the rotation thereof the husks of said corn will be removed from the ears and the husked ears moved to a suitable point of discharge.

With these and other objects in view as will appear as the description proceeds, the invention accordingly consists in the novel features of construction, combination of elements and arrangement of parts, hereinafter more fully described and having the scope thereof defined by the appended claims.

In the drawings, wherein has been shown one of the preferred embodiments of the invention:

Figure 1 is a longitudinal sectional view taken through the husking mechanism comprising the present invention, Fig. 2 is a side elevation thereof, Fig. 3 is a top plan view, Fig. 4 is a transverse sectional view taken along the line 4—4 of Fig. 3, Fig. 5 is a detail horizontal sectional view taken along the line 5—5 of Fig. 1, Fig. 6 is a detail transverse sectional view, disclosing the mechanism for effecting the rotation of the roll brushing mechanism, Fig. 7 is an enlarged transverse sectional view taken through the forward members of the shredding mechanism, Fig. 8 is a similar view taken through the rear members of said shredding mechanism, and Fig. 9 is a vertical longitudinal sectional view taken through the shredding mechanism.

Similar characters of reference denote like and corresponding parts throughout the several views of the drawing.

Referring more particularly to the details of the invention, use is made of a bed frame 1, which in this instance is of a non-portable nature, the same including uprights 2, cross-bars 3 and longitudinally extending side bars 4. Secured to the cross-bars 3 and extending longitudinally of the frame 1 are a plurality of parallel guide bars 5 which latter are provided with spaced inclined side walls 6, defining therebetween substantially V shaped ear receiving guide-ways 7. Inclined side walls 8 are secured in any suitable manner to the frame 1 and serve to define an ear receiving hopper 9.

In order to convey corn deposited in said hopper longitudinally of the guide-ways 7, use is made of a plurality of lower conveyers 10. These lower conveyers in this instance consist of endless chains which are trained over fixed sprockets 11 carried by transversely extending shafts 12 and 13, the rear shaft 13 being, in turn, provided with a driving sprocket 14, which is coöperative with a source of power to be hereinafter specified. Each of the parallel extending, spaced chains comprising the lower conveyer 10 has the upper portion thereof located contiguous to the bottom of the guide-way 7 and is situated between the inclined side wall 6, thus it will be seen that ears of corn deposited within said guide-ways 7 will not engage with the upper portions of the conveyer chains, this feature being afforded by virtue of the inclined walls 6. Each of the chains from the conveyer 10 is provided at spaced intervals throughout its length with upwardly extending projections or flights 15, which are adapted to travel between the guide bars 5 and in the guide-ways 7, as shown in Fig. 1. Thus it will be seen that an ear of corn lying within any of the guide-ways 7 will be in position to be engaged by any one of the projections 15, so that said corn will be moved longitudinally of the guide-ways 7 and in unison with the conveyer 10.

In order to permit corn to be deposited in bulk within the hopper 9, without exercising strict care, and yet to insure the fact that the corn will be situated longitudinally of each of the guide-ways 7, there is provided a rotating fork member 16 which preferably consists of a drum shaped body extending transversely of the hopper 9 and having its ends journaled in bearings 17 provided upon vertical braces 18 secured to the side bars 4. This fork member is provided with radially extending arms 19, which are adapted to engage with corn passing through the guide-ways 7 so as to insure the fact that said ears of corn will extend longitudinally of the guide-ways, and in the event of an ear lying obliquely and transversely over said guide-ways, such latter disposed ears will be engaged by said arms 19 and forced into a position parallel with the conveyer 10. One extremity of the fork member 16 is provided with a fixed sprocket 20, over which a chain 21 is trained, this latter chain extending to a somewhat reduced sprocket 22 carried by the rear conveyer shaft 13. Hence it will be seen that the rotation or operation of the conveyer structure and the rotatable fork member 16 will be carried on in unison. Coöperative with the lower conveyer structure 10 is a superimposed conveyer structure 23, which as shown in Fig. 3, is located in vertical alinement with the lower conveyer 10. This latter structure 23 includes a rearwardly situated shaft 24, disposed to extend transversely of the frame 1, the ends of this shaft 24 being journaled in bearings 25 carried upon brackets 26 extending outwardly from vertically disposed uprights 27 mounted upon the frame 1. Sprockets 28 are carried in a fixed manner by the shaft 24 and over which are adapted to be trained conveyer chains 29, the latter being also trained over reduced sprockets 30 carried by a forwardly situated shaft 31. The ends of this shaft 31 protrude through elongated openings 33 formed in the side walls 8 and are journaled in bearings 34 carried by hinged bars 35. The bars 35 are hinged as shown at 36 to the uprights 27 and normally rest upon blocks 37 carried by the side bars 4. This construction permits the forward end of the conveyer structure 23 to be oscillated in order to compensate for the irregularities in the size of corn passing between the conveyer structures 10 and 23. This latter conveyer 23 has each of the chains thereof provided with fixed studs or flights 38 which are so positioned as to exactly register with the similar studs or projections 15 carried by the lower conveyer 10, in the manner shown in Fig. 1. Thus it will be manifest that when a pair of these studs register, an ear of corn will be securely locked and confined between the conveyers 10 and 23 and will be positively advanced lengthwise of the guide-ways 7, by virtue of the studs 15 and 38.

Corn thus confined between said conveyers will be subjected to the action of a shredding structure 39, which latter in this instance consists of an initial set of resilient metallic arms 40, which are firmly secured at their forward ends to the guide bars 5. The rearward ends of said arms 40 being curved so as to come into contact with the reduced ends of ears of corn confined between the conveyers. These rearward ends of the arms 40 are provided with teeth 41, which are sharpened to such extent that as the corn is forced through said arms, the same will have the husks thereof cut into shreds and in this manner loosened from the ears. To further augment this action, there is provided a rear shredding device 42, which in this instance includes a fixed member 43 rigidly carried by one of the cross-bars 3. This latter member is provided with upper and lower fixed studs 44 which extend transversely across the conveyer chains and pass through openings formed in a coöperative member 45. Helical springs 46 encircle the studs 44 and are connected with the member 45 so as to resiliently draw the latter toward the fixed member 43. These members 43 and 45 are provided with registering tapering sockets 47, which sockets are located in such relation with respect to the conveying structures that the same will resiliently grip ears of corn as the latter are conveyed rearwardly of the machine through the agency of said conveyers. These sockets are formed with offset teeth 48, as is shown in Figs. 8 and 9, so that as corn is frictionally forced through said sockets the husks thereof will be efficiently loosened from clinging engagement with the corn ears. Guide bars 49 extend between the bracket members 43 and 45 and serve to prevent undue sagging or separating movement of the conveyer chains and at the same time limit the inward movement of the resilient member 45 with respect to the fixed member 43. The rear shaft of the conveying structure 23 is provided with a fixed sprocket 50, over which a chain 51 is passed and leads to a source of power hereinafter more fully described.

The hopper structure 9ª terminates rearwardly in a downwardly inclined platform 52, and this platform is provided with curved chutes 53 formed by curving the extremities of the guide bars 5, as is clearly shown in Fig. 3. These chutes terminate adjacent to longitudinally extending inclined rollers 54, which are journaled for rotation in a frame construction 55 forming a part of the bed frame 1. The surfaces of these rolls are preferably fluted or serrated, as shown at 56, and it will be observed upon reference to Fig. 4 that the rollers are arranged in pairs, one roller of each set being situated substantially above its coöperative roller, this construction being desirable to prevent an ear of corn from being caught between the revolving surfaces of said rollers 54 and thus crushed or destroyed, but through the elevated arrangement of the rollers shown only the shredded husks thereof will be engaged by said rollers so as to be torn free from engagement with the ears. It will be appreciated of course that the rollers revolve inwardly or toward each other, as shown by arrows in Fig. 6.

The chutes 53 terminate adjacent to the meshing portion of the rollers 54 so as to insure this husking operation.

To effect the rotation of the rollers 54 and other movable parts of the machine, use is made of a transversely extending power shaft 57, which is journaled in suitable bearings 58 carried by the frame 1, and has one of its ends equipped with fixed and loose pulleys 59, over which a belt may be passed leading to any suitable source of power. This shaft 57 is provided, as shown in Fig. 5, with a plurality of miter gears 60, which mesh with similar gears 61 carried upon the forward end of roller shafts 62. These shafts 62 being journaled within fixed blocks 63. It will be noted that only the upper of the roller shafts 62 are equipped with the gears 61. Then to transfer motion to the coöperative lower gears of the rollers, the latter are provided adjacent to the blocks 63 with cog gears 64 at their forward ends which permit of their uniform rotation, and in order to insure the meshing of the gears 64, the extremities 62ª are journaled within movable blocks 65, which blocks are provided with inclined surfaces which are disposed to engage with wedges 66. Thus it will be seen that by drawing the edges 66 inwardly or rearwardly through the medium of ties 67, said block 65 will be moved toward the coöperative block 63, thus drawing the gears 64 into closer frictional relation and permitting of the convenient alinement of the rollers 54. This power shaft 57 is also provided with a fixed sprocket 68 over which a chain 69 is passed and extends to the rear shaft of the conveyer 10, whereby the rotation of said latter conveyer is effected.

Further, the shaft 57 is provided with a beveled gear 70, situated to mesh with a similar gear 71, this latter gear being mounted upon a longitudinally extending counter shaft 72 which is mounted for rotation in fixed brackets 73. This shaft 72 is equipped with a sprocket 74 over which an endless chain 75 is trained. This chain 75 is also passed around sprockets 76 carried by the forward ends of brush shafts 77, over an idler 78 and back to the sprocket 74, whereby the rotation of said brush shafts 77 are effected. These brush shafts extend parallel with the rollers 54, and are equipped with bristles 79 which are adapted to engage with the fluted portions of said rollers 54, in order that all husk which will accumulate there or adhere to said rollers may be removed.

In order to advance the corn rearwardly of the rollers 54 during the husking operation, use is made of a conveyer structure 80, which consists of a plurality of spaced endless chains 81 positioned to extend parallel with the rollers 54. These chains 81 at their forward ends are trained about fixed sprockets 82 and at their rearward ends about similar sprockets 83. The sprockets 82 being mounted upon a transversely extending shaft 84 while the sprockets 83 are mounted upon a similarly extending shaft 85 located at the extreme rear end of the frame 1. These chains 81 are transversely connected by means of cross cleats 86, which are arranged to pass over the rollers 54, in the direction indicated by the arrow B shown in Fig. 1, thus drawing the corn rearwardly of said rollers to a point of discharge 87 at the rear of the frame 1. This shaft 85 is rotated by equipping one end of the same with a fixed sprocket 88, over which an endless chain 89 is passed leading to a fixed sprocket 90 carried by the power shaft 57.

From the foregoing description of the construction of my improved device the manner of applying the same to use and its operation will be readily understood, and it will be seen that I have provided a simple, inexpensive and efficient apparatus for carrying out the objects of the invention.

While I have particularly described the elements best adapted to perform the functions set forth, it is obvious that various changes in form, proportion and in the minor details of construction may be resorted to, within the scope of the appended

Having thus described the invention what I claim is:

1. In corn husking mechanism, the combination with a frame structure, of a longitudinally extending substantially V shaped guide formed with said structure, an endless conveyer movable lengthwise of said guide, a projection carried by said conveyer and adapted to engage with an ear of corn deposited in said guide to move the same ear in unison with said conveyer, a superimposed conveyer carried by said structure and arranged immediately above said first named conveyer, means carried by said latter conveyer for coöperation with said projection to effect the positive advance of corn confined between said conveyers, and a shredding structure mounted between said conveyers and adapted to engage with corn during the period of retention of the latter between said conveyers.

2. In corn husking mechanism, the combination with a hopper structure, comprising a plurality of parallel guides formed to include inclined side walls, a plurality of conveyers positioned within said guides and movable longitudinally thereof, studs formed at spaced intervals throughout the length of said conveyer and adapted to travel in said guides and between the walls thereof, of a superimposed set of conveyers coöperative with said first named conveyers, means for permitting of the pivotal movement of said last named conveyer, studs positioned at spaced intervals upon said second conveyer and adapted to register with said former studs to effect the positive advance of corn situated between said conveyers, and shredding mechanism situated to engage with said corn during the advance of the latter between said conveyers.

3. In a corn husking machine, in combination, a hopper structure formed to include a longitudinally extending guide-way having spaced side walls, a shredding mechanism situated within and adjacent to the discharge end of said guide-way, a conveyer operating contiguous to said guide-way and in parallelism therewith, flights carried by said conveyer and operating between the side walls of said guide-way to advance corn longitudinally of the latter and toward said mechanism, rotating means within said guide-way engageable with said corn to insure a longitudinally positioning of the same, a second conveyer parallel with said former conveyer and situated above the latter and said mechanism, and flights carried by said last named conveyer and coöperative with said former flights to effect a positive and forced advance of corn completely through said shredding mechanism.

4. In a corn husking machine, in combination, a hopper structure formed to embody a longitudinally extending guide-way having spaced side walls, a shredding mechanism situated within and adjacent to the discharge end of said guide-way, an endless conveyer operating contiguous to the bottom of said guide-way and in parallelism with the latter, spaced flights carried by said conveyer and operating between side walls of said guide-way to effect a longitudinal advance of corn therein toward said mechanism, rotatable means within said guide-way for insuring a lengthwise positioning of the corn prior to its introduction into said mechanism, a second conveyer parallel with said former conveyer and mounted above the latter and said mechanism, flights carried by said last named conveyer for coöperation with said former flights to effect a positive and forced advance of corn completely through said shredding mechanism, and means permitting of pivotal movement on part of said last named conveyer relative to said shredding mechanism to accommodate the conveyers to corn of varying thicknesses.

In testimony whereof I affix my signature.

FRED A. FISHBAUGH.

Witnesses:
  H. H. CRABBE,
  ANNA HILL.